United States Patent [19]

Thrush

[11] E Patent Number: Re. 33,402

[45] Reissued Date of Patent: Oct. 23, 1990

[54] PROTECTIVE CARRYING CASE FOR VIDEO CASSETTE APPARATUS AND METHOD OF ENCLOSING THEREOF

[75] Inventor: Ted K. Thrush, Phoenix, Ariz.

[73] Assignee: Portavideo International, Inc., Tempe, Ariz.

[21] Appl. No.: 295,655

[22] Filed: Jan. 10, 1989

Related U.S. Patent Documents

Reissue of:

[64] Patent No.: 4,669,001
Issued: May 26, 1987
Appl. No.: 552,159
Filed: Nov. 15, 1983

U.S. Applications:

[63] Continuation-in-part of Ser. No. 530,897, Sep. 12, 1983, Pat. No. Des. 281,200.

[51] Int. Cl.[5] ..... B65D 85/00; B65D 85/30; H04N 5/782

[52] U.S. Cl. ..... 360/33.1; 206/320; 369/12; 360/137

[58] Field of Search ..... 369/10, 12, 76, 75.1; 360/33.1, 137; 312/7.1, 7.2, 8, 20; 358/254, 335; 70/50, 63; 150/52 R; 190/26; 206/320; D14/16, 2; D3/33

[56] References Cited

U.S. PATENT DOCUMENTS

| | | | |
|---|---|---|---|
| D. 198,937 | 8/1984 | Kitts | D14/16 |
| D. 224,323 | 7/1972 | Seager | D14/2 |
| D. 268,027 | 2/1983 | Takashima et al. | D14/2 |
| D. 275,818 | 10/1984 | Leiserson | D3/33 |
| D. 281,200 | 11/1985 | Thrush | D3/33 |
| 2,543,146 | 2/1951 | Bace | 358/254 |
| 2,640,885 | 6/1953 | Kuhlik | 369/75.1 |
| 3,019,300 | 1/1962 | Gormel | 369/76 |
| 3,135,835 | 6/1964 | Steidinger et al. | 369/76 |
| 3,515,046 | 6/1970 | Ippolito et al. | 312/20 |
| 3,761,643 | 9/1973 | Keeler | 360/76.4 |
| 3,960,300 | 6/1976 | Dickler | 150/52 R |
| 4,006,764 | 2/1977 | Yamamoto et al. | 150/52 R |
| 4,058,993 | 11/1977 | Stubbings | 70/63 |
| 4,267,430 | 5/1981 | Downey | 339/153 R |
| 4,420,078 | 12/1983 | Belt et al. | 206/305 |
| 4,458,813 | 7/1984 | Toshinsky et al. | 206/320 |

FOREIGN PATENT DOCUMENTS 0465739 5/1937 United Kingdom .

*Primary Examiner*—Stuart S. Levy
*Assistant Examiner*—Hoa Nguyen
*Attorney, Agent, or Firm*—H. Gordon Shields

[57] ABSTRACT

A protective carrying case for an electronic device, especially a video cassette recorder, having upper and lower carrying case halves of high impact material with the video cassette recorder positioned therebetween. The upper and lower carrying case halves are integrally coupled to each other. First and second cover members rotatably connected to the upper and lower case halves are provided for affording access to the video cassette recorder cassette door and electrical connections respectively, the electrical connections passing through an integral barrier between the upper and lower carrying case halves for protectively isolating the video cassette recorder from a user thereof. A control panel allows a user access to at least a portion of the video cassette recorder's manual controls.

13 Claims, 3 Drawing Sheets

16
8
42
12
44
46
14
48
50
52
66
68
70
62
64
20
22
76
54
72
56
74
11
58
60
26
28
18

PROTECTIVE CARRYING CASE FOR VIDEO CASSETTE APPARATUS AND METHOD OF ENCLOSING THEREOF

Matter enclosed in heavy brackets [ ] appears in the original patent but forms no part of this reissue specification; matter printed in italics indicates the additions made by reissue.

*CROSS-REFERENCE TO RELATED APPLICATION*

*This application is a continuation-in-part application of U.S. Pat. No. D. 281,200, issued Nov. 5, 1985.*

BACKGROUND OF THE INVENTION

The present invention relates, in general, to the field of protective carrying cases and methods. More particularly, the protective carrying case [amd] *and* method of the present invention is of especial utility effectuating in the portability and tamper-resistant accessibility of electronic equipment, particularly a video cassette recorder (VCR).

Numerous devices and methods have been heretofore described for the protection of various electronic and other equipment by means of a protective case. One example is U.S. Pat. No. 3,960,300 issuing to Dickler on June 1, 1976 for a "TamperProof Backpack". In the field of electronic equipment, in particular, such previously described devices and methods include: U.S. Pat. No. 2,467,471 issued to Goldstein for a "Portable Audio Cover" and U.S. Pat. No. 4,006,764 issued to Yamamoto et al. on Feb. 8, 1977 for a "Protection Case for Tape-Recorder or Radio-Set."

In conjunction with such equipment, various means have been described for attempting to prevent tampering with an encased piece of equipment. See for example U.S. Pat. Nos. 2,543,146 issued to Bace on Feb. 27, 1951 for a "Television Cabinet with Sliding Removable Chassis" and 4,058,993 issued to Stubbings on Nov. 22, 1977 for a "Lock Box".

In the field of video playback units, there has previously been described a "Video Playback Unit in Inacceptable Container", U.S. Pat. No. 3,761,643 issued to Keeler on Sept. 25, 1973.

Current market estimates show that only 5% of all households own a video cassette recorder. Yet, a significant portion of the remaining households would at least, on occasion, desire access to one in conjunction with their television receiver. With the wide spread accessibility of numerous video cassettes currently available for short-term rental to the public, it would be highly desirable to also afford the public an opportunity to rent a video cassette recorder at the same time. In this application, the term recorder includes a [record] *recorder* and/or player.

In order to effectuate this goal, the unit must be ruggedly protected yet be light in weight and pleasing in appearance. Moreover, the enclosed electronics must be readily accessible to qualified service technicians yet tamper-resistant to unauthorized access by the unit lessee. Further, while the user must have access to the recorder's electrical connections to hook-up the device, he must be protected from [inadvertant] *inadvertent* contact with dangerous electrical currents within the protective case. Still further, the rental unit must have as long a service life as possible to minimize repair costs yet allow the user to operate all essential controls for a playback function. As the liability for private video recording is currently unresolved and the record function of a video cassette recorder causes the most tape-head wear, it would be desirable to present a user with access to only essential playback controls and present the least confusing number of buttons and switches to the unsophisticated user. None of the above-listed nor previously described units are capable of providing either this multitude of functions or fulfilling the various needs of the rental video cassette recorder market.

SUMMARY OF THE INVENTION

It is therefore an object of the present invention to provide an improved protective carrying case and method.

It is further an object of the present invention to provide an improved protective carrying case and method which is exceptionally durable yet attractively finished.

It is still further an object of the present invention to provide an improved protective carrying case and method which provides a user with ease of accessibility to essential manual controls and electrical connections to an item of electronic equipment yet effectively isolates the equipment from tampering while nonetheless allowing for ease of servicing by authorized personnel.

It is still further an object of the present invention to provide an improved protective carrying case and method for an item of electronics equipment, in particular, a video cassette recorder, which may be readily operated by inexperienced personnel yet protect them from potentially dangerous electrical shock hazards.

It is still further an object of the present invention to provide an improved protective carrying case and method which is of exceptional utility for use with rental video cassette recorders.

The foregoing and other features and objects are achieved in the present invention wherein there is provided a protective carrying case including an enclosed video cassette recorder which comprises upper and lower carrying case halves, the video cassette recorder being positioned within the lower carrying case half. Means are provided for securing the upper carrying case half to the lower carrying case half at a plurality of peripheral points thereof. A first access means affords access to a cassette door of the video cassette recorder *being positioned within the lower carrying case half. Means are provided for securing the upper carrying case half to the lower carrying case half at a plurality of peripheral points thereof. A first access means affords access to a cassette door of the video cassette recorder* while a second access means affords additional access to electrical connections to the video cassette recorder. The electrical connections pass through an integral barrier within the upper and lower carrying case halves for protectively isolating the video cassette recorder from a user thereof while providing storage for the electrical connections. A control panel allows access to at least a portion of the video cassette recorder's manual controls including those necessary to effectuate a cassette playback function.

BRIEF DESCRIPTION OF THE DRAWINGS

The above-mentioned and other features and objects of the present invention, and the manner of attaining them will become more apparent, and the invention itself will be best understood by reference to the following description of an embodiment of the invention taken in conjunction with the accompanying drawings wherein.

DESCRIPTION OF A PREFERRED EMBODIMENT

Figure 1:
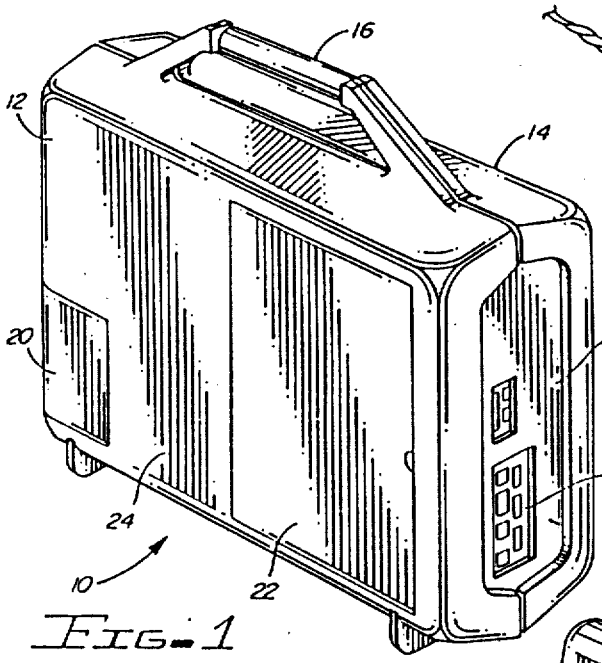
FIG. 1 is an isometric view of an embodiment of the present invention illustrating the handle and control panel as well as the cable and cassette access covers of the upper case portion.
Figure 4:
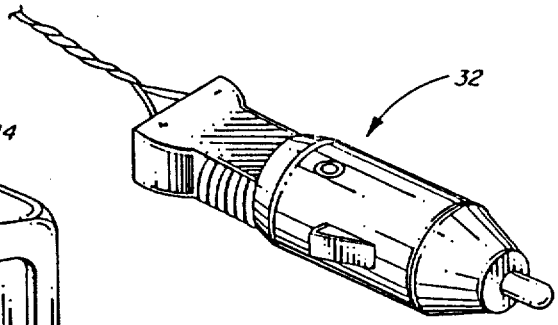
FIG. 4 is a detailed view of the conventional 12 volt DC plug shown in FIG. 2 for use with an automobile cigarette lighter power source.

With reference now to FIG. 1, a protective carrying case 10 in accordance with the present invention is shown. In the embodiment shown, as well as in the ensuing description thereof, a protective carrying case 10 is utilized in conjunction with a video cassette recorder (VCR). However, the inventive principles of protective carrying case 10 are applicable to uses in conjunction with various other items of portable electronic equipment.

Protective carrying case 10 comprises, in pertinent part, an upper case portion 12 as secured to a corresponding lower case portion 14. A handle 16 is formed on one side of protective carrying case 10 comprising portions of both upper case portion 12 and lower case portion 14. A control panel 18 adjacent one end of protective carrying case 10 allows the user to operate the electronic equipment encased within protective carrying case. In the embodiment illustrated, control panel 18 affords access to a portion of VCR controls 28.

By use of control panel 8, only a portion of VCR controls 28 are accessible to a user. In general, control panel 18 will be used to preclude a user from utilizing the VCR record controls. When used as a rental unit, protective carrying case 10 in using a control panel 18, will afford a longer operating life time between servicing to encased VCR unit. It is [been] *being* found, that use of the record heads of a VCR unit causes more wear and more unit down time for servicing than when merely used as a playback unit. Furthermore, it currently remains unsettled whether affording a record capability to a rental user would cause the lessor of the unit to [incure] *incur* legal liabilities for copyright infringement. Still further, by use of the control panel 18, a non-confusing and readily understandable portion of VCR controls 28 may be displayed thereby simplifying operation for the unsophisticated user.

Protective carrying case 10 also incorporates a cassette access cover 22 and cable access cover 20 hingedly interconnected to upper case portion 12 and lying in a generally planar relationship to upper surface 24 thereof when closed.

Figure 2:
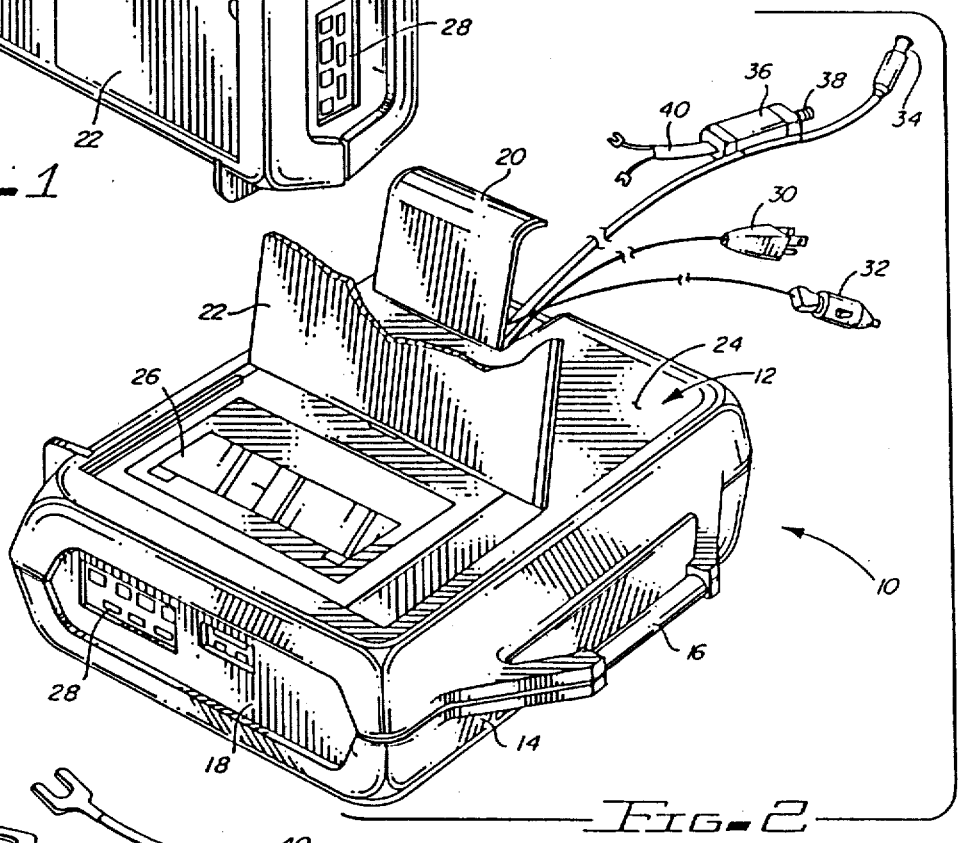
FIG. 2 is another isometric view of the embodiment of FIG. 1, showing the protective carrying case of the present invention when used in conjunction with, for example, a VCR and illustrating the electrical connections to a television and power source through the cable access cover and having the cassette access cover open and partially cutaway to show the VCR cassette case.
Figure 3:
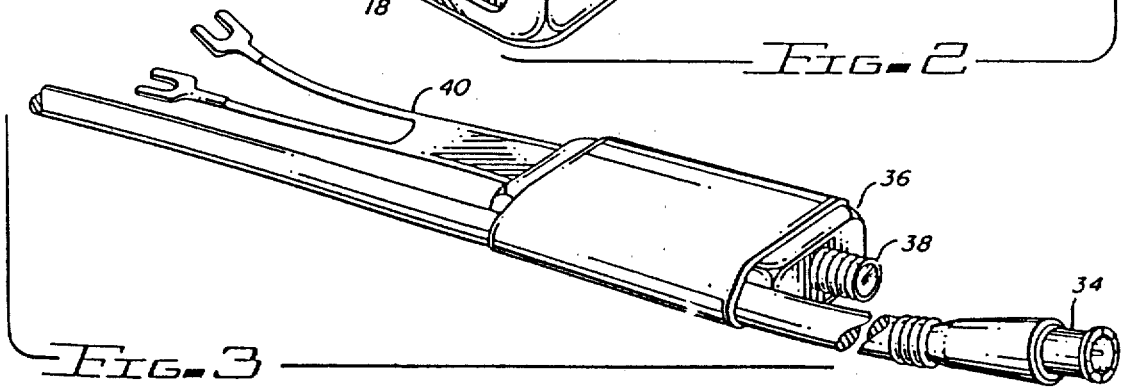
FIG. 3 is a detailed view of the television connections accessible through the cable access door of FIG. 2 showing a 75 ohm male connection and matching transformer for conversion to a 300 ohm antenna input.

Referring additionally now to FIG. 2, protective carrying case 10 is shown as readied for use. By opening cassette access cover 22, access is afforded to VCR cassette door 26 of the encased VCR for insertion or removal of the video cassette. Interconnection of the encased VCR within protective carrying case 10 is effectuated by means of a plurality of cables housed within cable access cover 20 which may be opened to allow their removal for interconnection to a television receiver. As shown, among these plurality of cables may be a conventional AC plug 30 or, alternatively, a 12 volt DC plug 32. AC plug 30 would be used when the VCR is to be utilized in a stationary environment having access to a source of 120 volts AC. Alternatively, 12 volt DC plug 32 would be utilized in a mobile operation of an encased VCR in conjunction with protective carrying case 10.

A 75 ohm male connector 34 supplies signal output [of] *on* the encased VCR to the antenna terminal of a television receiver. Should the television receiver not have the requisite coaxial connection to receive 75 ohm male connector 34, a matching transformer 36 may be affixed to the signal output cable. Matching transformer 36 affords a 75 ohm female connector 38 for threadably engaging within 75 ohm male connector 34. By means of matching transformer 36, 300 ohm twin lead [40] *340* may be attached to the screw terminals of a 300 ohm antenna input to a television receiver.

Figures 5, 6, 7:
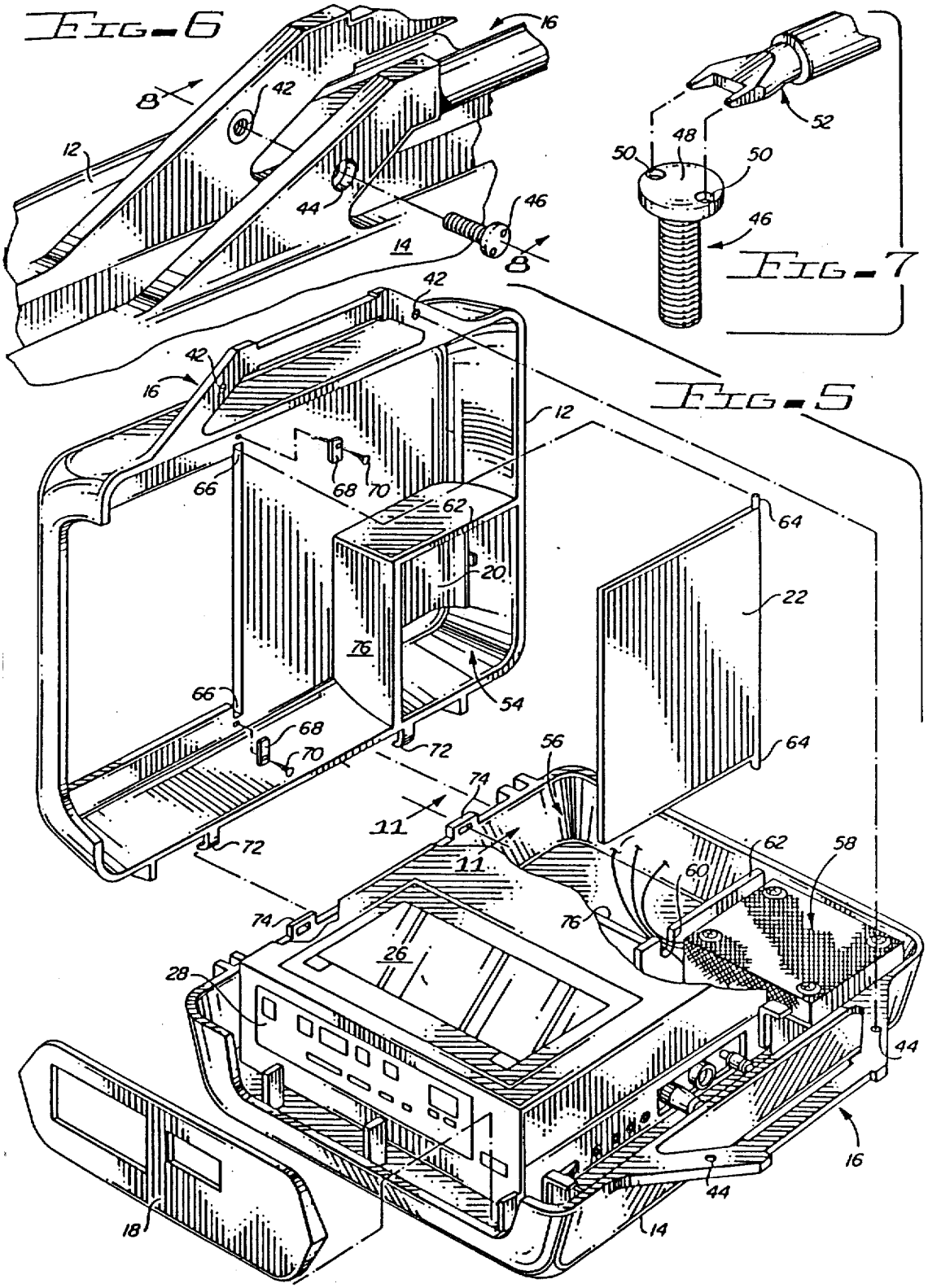
FIG. 5 is an exploded isometric view of the embodiment of FIG. 1 showing the upper and lower case portions thereof and their respective interlocking tongues and slots as well as the upper and lower cable storage chamber halves and the hinged construction of the cassette access cover.
FIG. 6 is an isometric detailed view of the means for securing the upper and lower case portions at the handle thereof shown in FIG. 5 by means of a tamper resistant screw.
FIG. 7 is a detailed view of the tamper resistant screw of FIG. 6 and showing a forked tool head for use in securing or removing the same.
Figure 9:
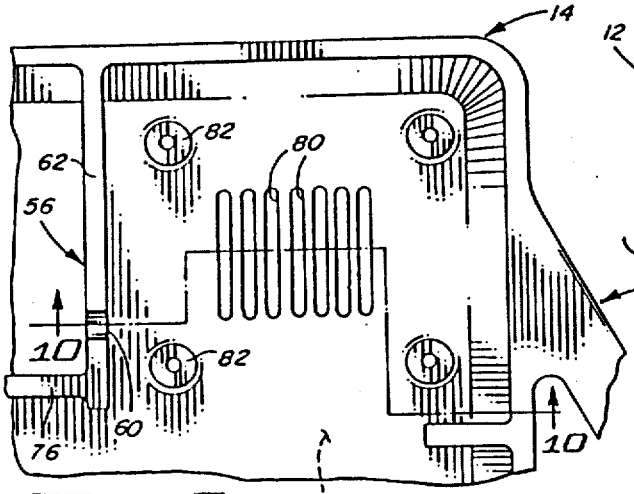
FIG. 9 is a top plan sectional view of the interior of the lower case half of FIG. 5 beneath the 12 volt power supply and illustrating the power supply mounting posts and ventilation slots as well as a portion of the power supply and VCR barrier walls.

Referring additionally now to FIG. 5, protective carrying case 10 is shown in a disassembled and exploded view thereof. In this view, the upper cable storage chamber half 54 and corresponding lower cable storage chamber half 56 are shown. Both upper cable storage chamber half 54 and lower cable storage chamber half 56 include a power supply barrier wall 62 and a VCR barrier wall 76 constructed perpendicularly thereto. Power supply barrier walls 62 of lower cable storage chamber half 56 includes a cable slot 60 through which pass the power supply and signal output cable from 12 volt power supply 58 and the encased VCR respectively. By means of power supply barrier wall 62 and VCR barrier wall 76 a user of the encased VCR is precluded from tampering with or possibly becoming injured by the electrical portions of 12 volt power supply 58 or the encased VCR. Upper and lower cable storage chamber halves 54, 56 afford a chamber within which the power supply and signal output cables may be stored for access from and removal through cable access cover 20.

As shown, protective carrying case 10 comprises, in pertinent part, an upper case portion 12 and corresponding lower case portion 14 which are hingedly interconnected in a clam-shell fashion by means of tongues 72 interlocking within slots 74. Control panel 18 is engaged within a portion of lower case portion 14 and held in place by means of upper case portion 12 when upper case portion 12 is secured to lower case portion 14. The interconnection of upper case portion 12 to lower case portion 14 will be more fully described hereinbelow.

Also illustrated is the hinged interconnection of cassette access cover 22 to upper case portion 12. In the embodiment of protective carrying case 10 shown, the hinged interconnection of cassette access cover 22 to upper case portion 12 will suffice as a description of the hinged interconnection of cable access cover 20 to upper case portion 12. For this reason, the ensuing description of the former shall suffice as a description of the latter.

Figure 13:
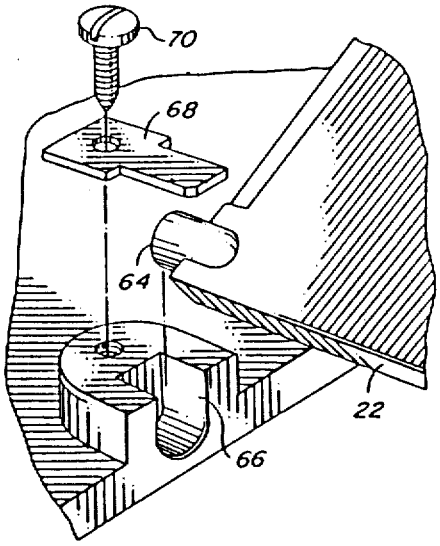
FIG. 13 is a detailed isometric view of a portion of the case upper half illustrating the exploded assembly for the hinged interconnection of the cassette access cover to the case upper half.

Cassette access cover 22 comprises a pair of oppositely disposed pins 64 adjoining one side thereof. Pins 64, as shown in more detail in FIG. 13, are rounded cylindrical projections which engage corresponding slots 66 within upper case portion 12. Pins 64 are retained within slots 66 by means of a like number of retainers 68 secured to upper case portion 12 by means of a like number of screws 70. By use of the hinge construction herein described, a durable and tamper resistant hinged attachment for cable access cover 20 and cassette access cover 22 is afforded.

Figure 11:
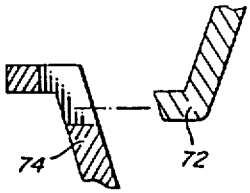
FIG. 11 is a detailed view of the tongue and slot of the upper and lower case halves respectively as shown in FIG. 5 taken substantially along section line 11—11.
Figure 11A:
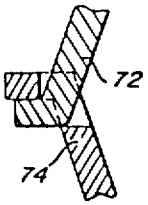
FIG. 11A is a detailed view of the tongue and slot shown in FIG. 11 showing the interlocking thereof.

Referring additionally now to FIGS. 6, 8, 8A, 11, and 11A the interconnection of upper case portion 12 to lower case portion 14 is shown. With reference especially now to FIGS. 11 and 11A, the hinged interconnection of upper case portion 12 to lower case portion 14 by means of tongues 72 engaging slots 74 is shown. By use of tongues 72 and slots 74, protective carrying case 10 may be readily opened by qualified and authorized service personnel to obtain access to the encased VCR or 12 volt power supply 58 should the need so arise.

Figure 8:
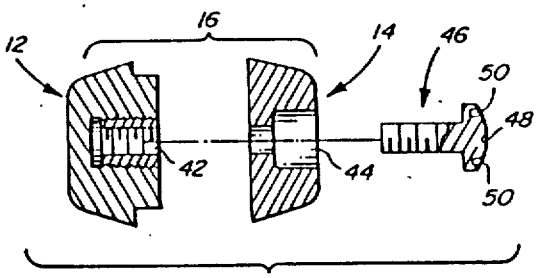
FIG. 8 is further detailed cross sectional view of the handle of the upper and lower case halves of FIG. 6 taken substantially along section line 8—8.
Figure 8A:
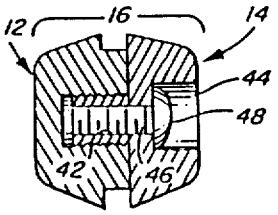
FIG. 8A illustrates the interconnection of the upper and lower halves at the handle thereof by means of a tamper resistant screw.
Figure 10:
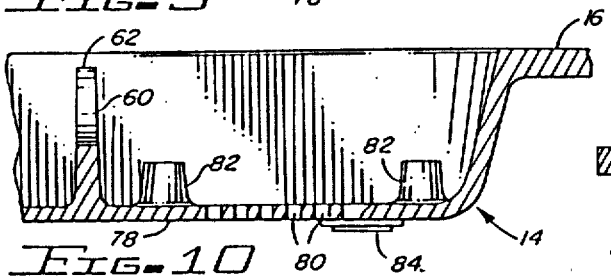
FIG. 10 is a cutaway, side plan view of the power supply portion of the lower case half of FIG. 9 taken substantially along section line 10—10.

To prevent the unauthorized access to the encased VCR and to protect users thereof, protective carrying case 10 provides a tamper resistant encasement of an electronic device by means of a pair of tamper resistant screws 46 threadably engaging a portion of handle 16. With reference especially now to FIGS. 6, 8, and 8A, the use of tamper resistant screws 46 is shown. Tamper resistant screws 46 threadably engage threaded [holes] *hole* 42 within handle 16 of upper case portion 12. Lower case portion 14 provides a corresponding number of counter sunk holes 42 through which tamper resistant screws 46 are passed such that upper case portion 12 is secured to lower case portion 14 adjacent handle 16.

With reference especially now to FIG. 7, a single one of tamper resistance screws 46 is shown. Tamper resistant screw 46 presents a screw head 48 having a pair of peripheral holes 50. By means of screw head 48 having peripheral holes 50, a special forked tool 52 is necessary in order to separate upper case portion 12 from lower case portion 14 by means of threadably disengaging tamper resistant screws 46.

Referring additionally now to [FIG.] *FIGS.* 9 and 10, a portion of lower case portion 14 is illustrated into which is mounted 12 volt power supply 58. Twelve volt power supply 58 is secured to lower case portion 14 at a plurality of mounting posts 82. A number of ventilation slots 80 underlie 12 volt power supply 58 and communicate between the interior portion of lower case portion 14 and lower surface 78 thereof. A number of mounting feet 84 are affixed to lower surface 78 to protect the surface onto which protective carrying case 10 may be placed as well as to enhance cooling air circulation through ventilation slots 80. By means of mounting posts 82, 12 volt power supply 58 will be accorded greater cooling air circulation therearound through ventilation slots 80 than if the lower portion of 12 volt power supply 58 were secured directly to the interior portion of lower [lower] case portion 14. As illustrated, the power supply and signal output cables to 12 volt power supply 58 and the encased VCR through lower cable storage chamber half 56 is made by means of cable slot 60 within power supply barrier wall 62.

Figure 12:
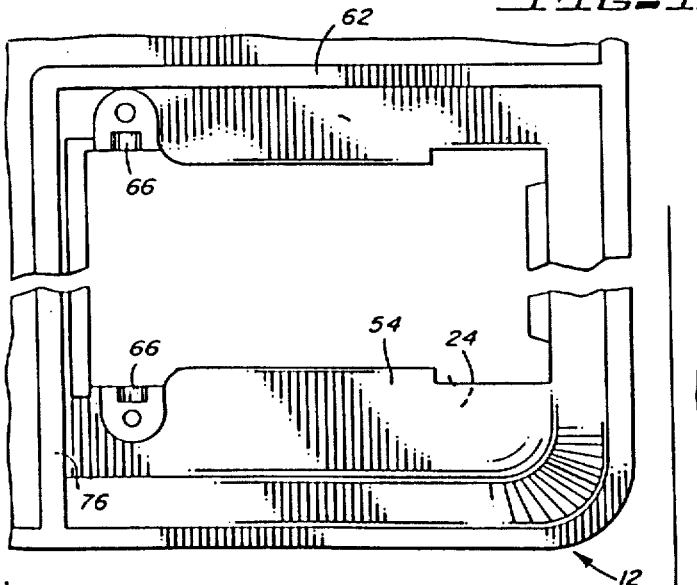
FIG. 12 is a bottom plan view of the upper cable chamber half of the upper case half, illustrated in FIG. 5 having the cable access cover removed.

Referring additionally to FIG. 12, the interior portion of upper case portion 12 comprising upper cable storage chamber half 54 is shown. In this illustration, cable access cover 20 has been removed. It can be seen, that by means of power supply barrier wall 62 and VCR barrier wall 76, a user of the encased VCR may be accorded access to the power supply and signal output cables of the device but is precluded from tampering with or being injured by the enclosed electrical and electronic equipment.

In the embodiment of protective carrying case 10 above described, all non-hardware portions thereof may be conveniently furnished as Borg Warner BJA 92202 Plastic. Such plastic is inherently fire retardant, durable and capable of sustaining severe impacts while protecting encased VCR. Moreover, this plastic may be readily textured to enhance its visual appearance while making smudges harder to detect visually. Moreover, this high impact plastic may be polished to give a glossy appearance. By use of the protective carrying case 10 above described, a VCR or other electronic device may be readily protected while being carried about. Moreover, when in use, ready access to all necessary controls may be easily effectuated as well as *access* to all electrical input and output connections and *to the* cassette loading and unloading portion. Protective carrying case 10 may be readily assembled to encase a VCR or other piece of electronic equipment yet is tamper resistant to unauthorized personnel. However, by means of an appropriate tool, protective carrying case 10 may be readily disassembled to allow access to the encased electronic equipment by qualified and authorized personnel.

While there have been described above the principles of the invention in conjunction with specific apparatus, it is to be clearly understood that this description is made only by way of example and not as a limitation to the scope of the invention.

I claim:

1. A protective carrying case for an enclosed video cassette apparatus, comprising:

upper and lower carrying case halves, said video cassette apparatus positioned within said carrying case halves;

means for securing said upper carrying case half to said lower carrying case half at a plurality of peripheral points thereof;

first access means located on an exterior portion of one of said upper and lower carrying case halves for affording quick access to a cassette door of said video cassette apparatus and to permit rapid loading and unloading of a video cassette therethrough and into and out of said enclosed video cassette apparatus;

second access means for additionally affording access to electrical connections of said video cassette apparatus;

control panel access means for allowing access to at least a portion of the video cassette apparatus' controls, said control panel access means is substantially integral to a front portion of said carrying case;

at least one of first feet support means coupled to a first side portion of said upper carrying case half and at least one of second feet support means coupled to a first side portion of said lower carrying case half for providing support and stability to said carrying case when said carrying case is rested on said first and second feet support means, said first feet support means are substantially proximate to said second feet support means when said upper and lower carrying case halves are connected together;

at least one set of ventilation port means located in at least one of said upper and lower carrying case halves for permitting circulation of cooling air for said video cassette apparatus located therein; and handle means for allowing hand gripping of said carrying case and for also providing a locking together of said upper and lower carrying case halves, said handle means coupled to second side portions of said upper and lower carrying case halves which second side portions are substantially on the opposite side of said first side portions to which are coupled said first and second feet support means.

2. The protective carrying case of claim 1 including third feet support means located between said first and second side portions of said upper and lower carrying case halves and connected to the exterior of said one of said upper and lower carrying case halves containing said one set of ventilation port means for enhancing cooling air circulation for said video cassette apparatus and for protecting the exterior surface of said one of said upper and lower carrying case halves.

[3. The protective carrying case of claim 1 wherein said upper and lower carrying case halves comprise a high impact plastic.]

[4. The protective carrying case of claim 3 wherein said high impact plastic being additionally fire retardant.]

[5. The protective carrying case of claim 4 wherein said high impact fire retardant plastic being Borg Warner JBA 92202.]

6. The protective carrying case of claim 1 wherein said upper and lower carrying case halves have a textured finish thereto.

7. The protective carrying case of claim 1 wherein said upper and lower carrying case halves have a glossy finish thereto.

[8. The protective carrying case of claim 1 wherein said video cassette apparatus being a portable unit capable of 12 VDC operation.]

[9. The protective carrying case of claim 8 wherein said video cassette apparatus further comprises a power supply for converting said portable unit to 120 VAC operation.]

[10. The protective carrying case of claim 1 wherein case securing means located opposite said handle means and comprising a tongue and slot interconnection are provided between said upper and lower carrying case halves.]

11. The protective carrying case of claim 1 wherein said handle means further includes tamper-resistant hardware.

12. The protective carrying case of claim 11 wherein said tamper-resistant hardware comprises a screw requiring a non-conventional removal tool.

[13. The protective carrying case of claim 1 wherein said first access means comprises a cover hingedly interconnected to said carrying case upper half.]

[14. The protective carrying case of claim 13 wherein said cover comprises a pair of integral and oppositely disposed pins for rotational retention to said carrying case upper half.]

[15. The protective carrying case of claim 1 wherein said second access means comprises a cover hingedly interconnected to said carrying case upper half.]

[16. The protective carrying case of claim 15 wherein said cover comprises a pair of integral and oppositely disposed pins for rotational retention to said carrying case upper half.]

[17. The protective carrying case of claim 1 wherein said electrical connections comprise a 12 VDC power input lead.]

[18. The protective carrying case of claim 1 wherein said electrical connections comprise a 120 VAC power input lead.]

[19. The protective carrying case of claim 1 wherein said electrical connections comprise a 75 ohm signal output lead.]

[20. The protective carrying case of claim 19 wherein said 75 ohm signal output lead further comprises impedance matching means to a 300 ohm signal output lead.]

21. The protective carrying case of claim 1 wherein said control panel access means comprises an [apertured] *aperture* plate secured between said upper and lower carrying case halves.

22. The protective carrying case of claim 1 wherein said control panel access means comprises an [apertured] *aperture* plate affording access to [all of] said video cassette apparatus' manual controls.

23. The protective carrying case of claim 1 wherein said handle means are an integral portion of said upper and lower carrying case halves.

24. A method for protectably enclosing a video cassette apparatus, comprising the steps of:

providing a carrying case comprising upper and lower carrying case halves;

positioning said video cassette apparatus within said upper and lower carrying case halves;

securing said upper carrying case half to said lower carrying case half at a plurality of peripheral points thereof;

providing access through an exterior portion of said carrying case to a cassette door of said video cassette apparatus enclosed within said carrying case to permit rapid loading and unloading of a video cassette therethrough and into and out of said enclosed video cassette apparatus;

providing access through another exterior portion of said carrying case to electrical connections of said video cassette apparatus;

providing access through a further exterior portion of said carrying case to at least a portion of the controls of said video cassette apparatus;

coupling at least one of first feet support means to a first side portion of said upper carrying case half and at least one of second feet support means to a first side portion of said carrying case lower carrying case half, said first and second feet support means providing support and stability to said carrying case when said carrying case is rested on said first and second feet support means, said first feet support means are substantially proximate to said second feet when said upper and lower carrying case halves are connected together;

providing at least one set of ventilation port means located in at least one of said upper and lower carrying case halves for permitting circulation of cooling air for said video cassette apparatus located therein; and providing handle means for allowing hand gripping of said carrying case and for also providing a locking together of said upper and lower carrying case halves, said handle means coupled to second side portions of said upper and lower carrying case halves which second side portions are substantially on the opposite side of said first side portions to which are coupled said first and second feet support means.

25. The method of claim 24 including the step of providing third feet support means located between said first and second side portions of said upper and lower carrying case halves and connected to the exterior of said one of said upper and lower carrying case halves containing said one set of ventilation port means for enhancing cooling air circulation for said video cassette apparatus and for protecting the exterior surface of said one of said upper and lower carrying case halves.

[26. The method of claim 25 wherein said carrying case is made of high impact plastic portions.]

27. The method of claim 25 wherein said handle means includes tamper-resistant hardware.

[28. The method of claim 25 wherein said step of providing access to said cassette door of said video cassette apparatus is carried out by means of a cover hingedly interconnected to said carrying case upper half.]

29. The method of claim 25 wherein said step of providing access to the controls of said video cassette apparatus is carried out by means of an apertured plate.

* * * * *